United States Patent [19]

Gianotti

[11] 4,442,633

[45] Apr. 17, 1984

[54] SUPPORTING DEVICE FOR THE VERTICALLY MOVABLE WINDOW PANEL OF A MOTOR-VEHICLE WINDOW

[75] Inventor: Giovanni Gianotti, Beinasco, Italy

[73] Assignee: Fiat Auto S.p.A., Turin, Italy

[21] Appl. No.: 397,725

[22] Filed: Jul. 13, 1982

[30] Foreign Application Priority Data

Jul. 22, 1981 [IT] Italy ................................ 68015 A/81

[51] Int. Cl.$^3$ ............................................. E05F 11/00
[52] U.S. Cl. ....................................... 49/375; 49/348; 49/360
[58] Field of Search .................. 49/374, 375, 348–352, 49/227, 40, 41, 360, 361, 362

[56] References Cited

U.S. PATENT DOCUMENTS 4,095,370  6/1978  Muehling .............................. 49/352
4,222,202  9/1980  Pigeon ................................ 49/375 X Primary Examiner—Kenneth Downey
Attorney, Agent, or Firm—Sughrue, Mion, Zinn, Macpeak, and Seas

[57] ABSTRACT

A supporting device for a vertically movable window panel of a motor vehicle comprises a guide element mounted on the motor vehicle structure, a slide member slidably mounted on the guide element and carrying the said window panel, and a pair of support elements for the window panel slidably mounted on the slide member for sliding in a direction substantially perpendicular to the direction of sliding of the slide member on the said guide element. Each of these support elements is provided with a resiliently deformable lug which can be snap engaged in a corresponding hole in the window panel.

2 Claims, 2 Drawing Figures

U.S. Patent  Apr. 17, 1984  4,442,633
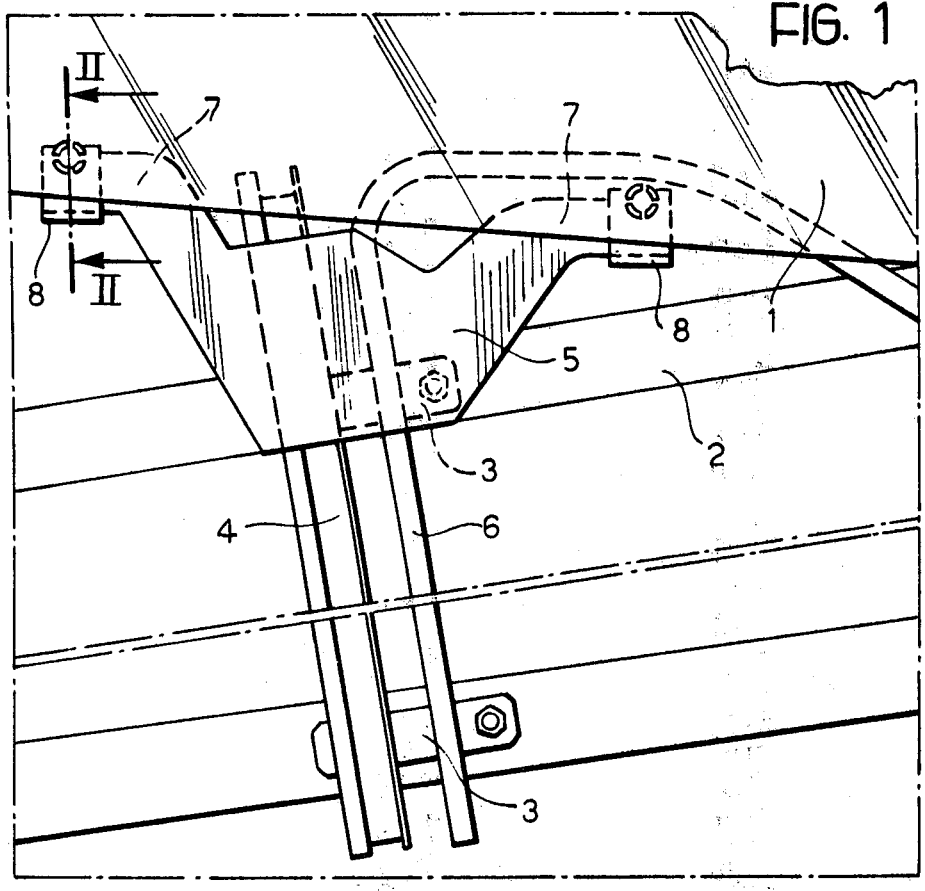
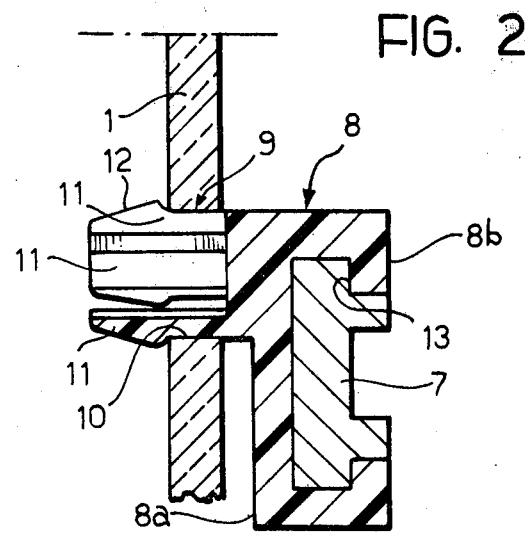

SUPPORTING DEVICE FOR THE VERTICALLY MOVABLE WINDOW PANEL OF A MOTOR-VEHICLE WINDOW

BACKGROUND OF THE INVENTION

The present invention relates to a device for supporting a vertically movable window panel of a motor vehicle window.

The object of the present invention is to provide a supporting device of the aforesaid type which allows the assembly of the window panel on its supporting structure during the manufacture of the motor vehicle to be simplified.

SUMMARY OF THE INVENTION

The main characteristic of the device according to the invention lies in the fact that this device includes a guide element intended to be mounted on the motor vehicle structure, a slide member slidably mounted on the guide element and carrying the said window panel, and a pair of support elements for the window panel which are mounted on the slide member for sliding movement in a direction substantially perpendicular to the direction of sliding of the slide member on the said guide element, each of these support elements being provided with a resiliently deformable lug which can be snap engaged in a corresponding hole in the window panel.

According to a further characteristic, each of the said support element is constituted by a unitary body of plastics material having the said resiliently deformable lug on one face and a guide groove on the opposite face which is slidably engaged on a corresponding arm of the said slide member.

BRIEF DESCRIPTION OF THE DRAWINGS

Further characteristics and advantages of the present invention will emerge from the following description with reference to the appended drawings, provided purely by way of non-limiting example, in which:

FIG. 1 is a front view of a supporting device according to the present invention, and FIG. 2 is a cross sectional view taken on line II—II of FIG. 1.

DESCRIPTION OF THE PREFERRED EMBODIMENT

In FIG. 1 reference numeral 1 indicates a vertically movable window panel (partially illustrated) of the window of a motor vehicle door. Reference numeral 2 indicates the internal frame of the door.

A guide element 4 is fixed on the frame 2 by means of two brackets 3, and a slide member 5 which carries the window panel is mounted on the guide element 4 for sliding movement in a substantially vertical direction. The vertical displacements of the slide member relative to the guide member 4 are controlled in a manner known per se by means of a flexible cable housed in a tubular casing 6. The structure and the disposition of the flexible cable, its casing and the transmission means connecting the flexible cable to the slide member 5 are not illustrated since they are known per se. Also the elimination of these constructional details from the drawings makes the latter more easy to understand.

The slide member 5 has two arms 7 which extend in a direction substantially perpendicular to the direction of sliding of the slide member 5 on the guide element 4. On these arms 7 are slidably mounted two support elements 8 to which the window panel 1 is fixed.

With reference to FIG. 2, each support element 8 is constituted by a unitary body of plastics material having on face 8a thereof a resiliently deformable lug 9 which can be snap engaged in a corresponding hole 10 in the window panel 1.

In the embodiment illustrated in FIG. 2, each resiliently deformable lug 9 is constituted by a circumferential series of tabs 11 disposed so as to give the lug 9 a tubular conformation with an enlarged, frusto-conical head 12.

The plastics body of each support element 8 also has, on its face 8b opposite the face 8a, a through-groove 13 of a substantially T-section engaged in a slidable manner on the free end of the corresponding arm 7 which has a form complementary to that of the groove 13.

The fixing of the window panel 1 on the slide member 5 is effected easily and rapidly by the prior arrangement of the support elements 8 on the arms 7 of the slide member 5 and the snap insertion of the lugs 12 in the corresponding holes 10 in the window panel 1.

Thanks to the two support elements 8 slidably mounted on the slide member 5, assembly of the window panel 1 can be effected even when the distance between the two holes 10 of the window panel differs from that specified because of a defect in manufacture.

Furthermore, once the window panel 1 is mounted on the slide member 5, the window panel is displaceable horizontally relative to the slide member 5 by sliding of the support elements 8 on the arms 7 of the slide member. This allows the vertical edges of the window panel to be inserted easily in the corresponding guides of the door of the vehicle even when the distance between these guides is different from the intended distance because of errors in the pressing of the door.

I claim:

1. A supporting device for a vertically movable window panel of a motor vehicle window, said device comprising a guide element intended to be mounted on the motor vehicle, a slide member slidably mounted on said guide element and arranged to carry the said window panel, and a pair of support elements for supporting the window panel on said slide member, said support elements being mounted on the slide member for sliding movement in a direction substantially perpendicular to the direction of sliding of the slide member on the said guide element, and each said support element being provided with a resiliently deformable lug snap engageable in a corresponding hole in the window panel.

2. A device according to claim 1, wherein each said support element is constituted by a unitary body of plastics material formed on opposite sides thereof respectively with said resiliently deformable lug and with a guide groove, said groove serving to slidably engage the support element on said slide member.

* * * * *